(12) United States Patent
Bamford

(10) Patent No.: US 7,178,060 B2
(45) Date of Patent: *Feb. 13, 2007

(54) TRANSMITTING DATA RELIABLY AND EFFICIENTLY

(75) Inventor: Roger J. Bamford, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 10/348,673

(22) Filed: Jan. 21, 2003

(65) Prior Publication Data

US 2003/0115501 A1    Jun. 19, 2003

Related U.S. Application Data

(63) Continuation-in-part of application No. 09/428,295, filed on Oct. 27, 1999, now Pat. No. 6,543,005.

(51) Int. Cl.
G06F 11/00   (2006.01)

(52) U.S. Cl. .................................................. 714/16
(58) Field of Classification Search ............... 714/16, 714/18, 39, 43, 47, 56, 20, 48, 748, 750; 709/232, 224, 228, 237
See application file for complete search history.

(56) References Cited

U.S. PATENT DOCUMENTS

| | | | |
|---|---|---|---|
| 5,319,641 A | 6/1994 | Fridrich et al. | |
| 5,870,406 A | 2/1999 | Ramesh et al. | |
| 5,931,915 A | 8/1999 | Benner et al. | |
| 6,014,710 A * | 1/2000 | Talluri et al. | 709/237 |
| 6,111,892 A * | 8/2000 | Rittle et al. | 370/465 |
| 6,112,323 A | 8/2000 | Meizlik et al. | |
| 6,128,283 A | 10/2000 | Sabaa et al. | |
| 6,269,080 B1 | 7/2001 | Kumar | |
| 6,275,471 B1 | 8/2001 | Bushmitch et al. | |
| 6,381,215 B1 | 4/2002 | Hamilton et al. | |
| 6,392,993 B1 | 5/2002 | Hamilton et al. | |
| 6,543,005 B1 * | 4/2003 | Bamford | 714/18 |
| 6,629,285 B1 * | 9/2003 | Gerendai et al. | 714/748 |
| 2002/0152315 A1 * | 10/2002 | Kagan et al. | 709/228 |

FOREIGN PATENT DOCUMENTS

WO    WO 97/22201 A2    6/1997

OTHER PUBLICATIONS

Sami Iren, et al., "The Transport Layer: Tutorial and Survey," ACM Computer Surveys, vol. 31, No. 4, Dec. 1999, p. 360-405.
Peter Parnes, "RTP extension for Scalable Reliable Multicast," Internet Draft (Online), Nov. 20, 1995, retrieved from http://www.cdt.luth.se/~peppar/docs/rtp_srm/draft-parnes-rtp-ext-srm-01.txt, retrieved Dec. 4, 2001.

(Continued)

Primary Examiner—Nadeem Iqbal
(74) Attorney, Agent, or Firm—Hickman Palermo Truong & Becker LLP

(57) ABSTRACT

A method and mechanism is described for reliably transmitting messages over an unreliable transport mechanism. A sender transmits a first message over an unreliable mechanism to a receiver, and a second message that identifies the first is transported over a reliable transport mechanism to the receiver. When the receiver receives the second message, the receiver determines whether it has received the first message. If not, the receiver requests retransmission of the first message.

58 Claims, 3 Drawing Sheets

OTHER PUBLICATIONS

Scott Petrack, "SISP-Simple Internet Signalling Protocol," Internet Draft (Online), Jun. 13, 1996, retrieved from http://www.watersprings.org/pub/id/draft-petrac-sisp-00.txt, retrieved on Dec. 4, 2001.

A. Basso et al., "Real-time MPEG-2 delivery based on RTP: Implementation issues," Sep. 1999, Signal Processing Image Communication 15, vol. 15, No. 1-2, pp. 165-178, XP004180643.

Carsten Griwodz et al., "Position Paper: Internet VoD Cache Server Design," ACM Multimedia 99 (Part 2), Oct. 30, 1999-Nov. 5, 1999, pp. 123-126, XP002173237.

Michael Zink et al., "LC-RTP (Loss Collection RTP): Reliability for Video Caching in the Internet", Proceedings Seventh International Conference on Parallel and Distributed Systems: Workshops, Proceedings Seventh International Conference on Parallel and Distributed Systems: Workshops, Iwate, Japan, Jul. 4-7, 2000, pp. 281-286, XP002173238.

Christopher Karl Hess, "Media Streaming Protocol: An Adaptive Protocol for the Delivery of Audio and Video Over the Internet," XP-000864222, 1998, pp. 1-53.

* cited by examiner

TRANSMITTING DATA RELIABLY AND EFFICIENTLY

RELATED APPLICATION

The present application is a continuation-in-part of U.S. patent application Ser. No. 09/428,295 now U.S. Pat. No. 6,543,005, entitled *Transmitting Data Reliably and Efficiently*, filed on Oct. 27, 1999 by Roger J. Bamford, the contents of which are incorporated by reference.

FIELD OF THE INVENTION

The present invention relates to transmitting data, and in particular, transmitting data efficiently in a manner that guarantees delivery.

BACKGROUND OF THE INVENTION

One critical function performed by a computer system is transmitting data between processes that may reside on the same or different computer systems. To transmit data between processes, the processes use a transport mechanism. A transport mechanism is a combination software and hardware that is used to transport data between processes. A transport mechanism may include a combination of, for example, a network, a network card, and interface software that allows a process to transmit data over the network. Often, transport mechanisms are accessed through the use of utilities provided by an operating system, such as sockets available in UNIX. To transmit data, a process invokes an operating system utility, which in turn communicates with the hardware of the computer system to transmit data over a network to another computer.

Transport mechanisms follow one or more protocols when transmitting data. A protocol is a set of rules, procedures, and conventions that govern the process of transmitting data. Some protocols implement one or more layers of the Open System Interconnection ("OSI") model. The OSI reference model is composed of seven layers, each specifying particular network functions. The OSI reference model is described in *Internetworking Technologies Handbook*, 3$^{rd}$ Edition, by Cisco Systems, Inc., February, 2001, the contents of which are incorporated herein by reference.

One layer defined by the OSI reference model is the transport layer. The transport layer is responsible for error checking, error control, and/or flow control. Examples of conventional protocols that implement the transport layer are the Transmission Control Protocol (TCP) and User Datagram Protocol (UDP). TCP is described in *The Transport Layer: Tutorial and Survey*, Sami Iren, Paul D. Amer, and Phillip T. Conrad, the contents of which are herein incorporated by reference.

Protocols, such as TCP and UDP, involve a tradeoff between two competing transport mechanism characteristics—reliability and speed. Reliability refers to a transport mechanism's ability to guarantee delivery of data transmitted by a sender to a receiver. A sender is a process that invokes a transport mechanism to transmit data to another process referred to as the receiver. A reliable transport mechanism guarantees delivery of data transmitted by a sender to a receiver. Transport mechanisms that use TCP are examples of reliable transport mechanisms. An unreliable transport mechanism does not guarantee delivery of data. Transport mechanisms that use UDP are examples of unreliable transport mechanisms.

In general, reliable transport mechanisms are not as fast as unreliable transport mechanisms. Reliable transport mechanisms invoke procedures, such as handshaking algorithms, that ensure that data transmitted is delivered. These procedures, while ensuring delivery, cause greater overhead and latency. For example, a reliable transport mechanism is used to transmit data over a network from a sending node to a receiving node. Data transmitted over the network to the receiving node is stored in buffers. When the receiving node receives the data, it transmits an acknowledgement to the sending node. When the sending node receives the acknowledgement, it releases the buffers, enabling them to be used for other purposes. If the sending node does not receive an acknowledgement from the receiving node after a period of time, then the sending node retransmits the data to the receiving node.

Based on the foregoing, it is clearly desirable to provide a method and mechanism for reliably transporting data without incurring the overhead incurred by conventional reliable transport mechanisms.

SUMMARY OF THE INVENTION

A method and mechanism is described for reliably transmitting messages over an unreliable transport mechanism. According to an aspect of the present invention, a sender transmits a first message over an unreliable mechanism to a receiver, and a second message that identifies the first is transported over a reliable transport mechanism to the receiver. When the receiver receives the second message, the receiver determines whether it has received the first message. If not, the receiver requests retransmission of the first message.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for transmitting data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Exemplary Message Transmission System

Figure 1:
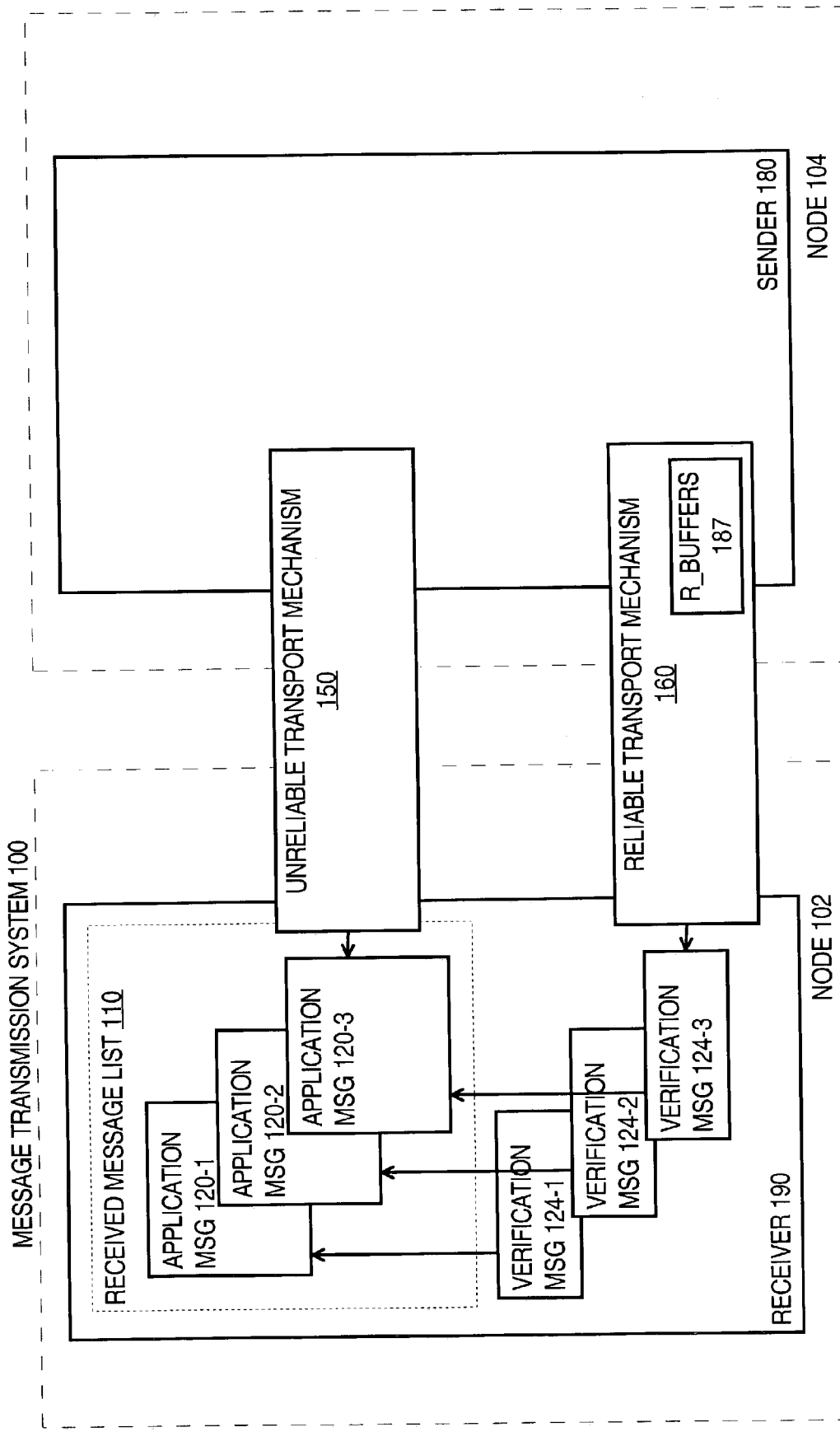
FIG. 1 is a block diagram of an exemplary message transmission system upon which an embodiment of the present invention may implemented.

FIG. 1 shows an exemplary message transmission system 100 according to an embodiment of the present invention. Receiver 190 and sender 180 are processes that reside on nodes 102 and 104, respectively. Sender 180 transmits messages to receiver 190 over unreliable transport mechanism 150 and reliable transport mechanism 160. A message is an identifiable set of data transmitted from a process to another process.

Specifically, sender 180 transmits application messages, such application messages 120, to receiver 190 over unreliable transport mechanism 150, and transmits verification messages, such as verification messages 124, over reliable transport mechanism 160. A verification message is a message transported over a transport mechanism that identifies to the receiver of the message another message that should be received by the receiver over another transport mechanism. An application message is a message identified by a verification message.

For example, receiver 190 and sender 180 may be a processes under the control of a database server. Sender 180 sends to receiver 190 database data blocks over unreliable transport mechanism 150 in the form of application messages 120. A database data block is a unit of storage that holds rows for a table. Typically, the database blocks are stored in persistent storage. The size of a data block is such that it may be stored in buffers used by the database server to access data in persistent storage.

To indicate to receiver 190 that the application messages 120 have been sent, sender 180 transmits verification messages 124 to identify application messages 120. Verification messages 124-1, 124-2, and 124-3 identify application messages 120-1, 120-2, 120-3, respectively.

Typically, the quantity of data required to identify an application message is much smaller than the quantity of data in the application message. Consequently, the verification message is smaller than the application message it identifies. In addition, a verification message may identify more than one application message.

The amount of time needed to transmit a message from a sender to a receiver is referred to herein as latency. Even though an application message is greater in size, under normal operating conditions, the latency for transmitting an application message over an unreliable transport mechanism is less than the latency for transmitting a verification message because of the overhead associated with the reliable transport mechanism.

Unreliable transport mechanism 150 and reliable transport mechanism 160 may transmit data over the same or different networks, including networks that use different types of mediums. For example, unreliable transport mechanism 150 and reliable transport mechanism 160 may transmit data over the same network between a first computer and second computer, where the first computer is connected to the network via a network card and where the network uses a copper wire cable. Or, unreliable transport mechanism 150 and 160 may use a different network, through separate network cards on the first computer that are connected to different LANs that follow different LAN protocols and that transmit data at the same or different speeds. LAN protocols include those that implement the data link and physical layers of the OSI reference model. Examples of LAN protocols include Ethernet and the Fiber Distributed Data Interface. The network used transport mechanisms 150 or 160 may use more than one type of medium, for example, a LAN that uses copper cable connections and a WAN ("wide area network") that uses optical connections.

The networks that may be used by transport mechanisms 150 and 160 are not limited to cable based medium. For example, transport mechanism 150 and 160 may use wireless networks.

In addition, the networks used may be packet based. Thus, when unreliable transport mechanism 150 and reliable transport mechanism 160 transmit an application message or verification message, the message may be transmitted as one or more smaller messages in the form of packets.

The reliable and unreliable protocols may be implemented completely in software or in hardware. For example, reliable transport mechanism 150 and 160 may use a network card on a computer. The network card may include a processor and firmware embedded with code, which when executed by the processor, cause data to be transmitted over the network using UDP and/or TCP protocols. Or, the network card may include hardware circuitry configured to carry out UDP and/or TCP.

Message list 110 contains application messages received by receiver 190 that are part of a set of messages to be received as a unit. When a member of the set is received, it is added to the list. The application message is then processed by the receiver for the purpose the message was transmitted. As shall be explained in greater detail, receiver 190 uses the received message list 110 to track which members of a set of application messages have been received. Received message list 110 includes application messages 120-1, 120-2, and 120-3.

Use of Buffers by the Transport Mechanisms

R_Buffers 187 are used by reliable transport mechanism 160 to store copies of verification messages that it transmits from node 104 to node 102 over the network link used by reliable transport mechanism 160. Reliable transport mechanism 160 stores a copy of a verification message it transmits over the network link until reliable transport mechanism 160 determines whether or not the verification message has been successfully received by node 102. If reliable transport mechanism 160 determines that the verification message was not successfully received, reliable transport mechanism 160 gets the message from the R_Buffer 187 containing a copy of the verification message, and retransmits it over the network link. If reliable transport mechanism 160 determines that the verification message was successfully received, then the R_Buffer 187 that contained a copy of the transmitted verification message is released to be used for other purposes.

On the other hand, unreliable transport mechanism 150 does not store a copy of an application message after transmitting it to the network link used by unreliable transport mechanism 150.

Transmitting Messages

Figure 2:
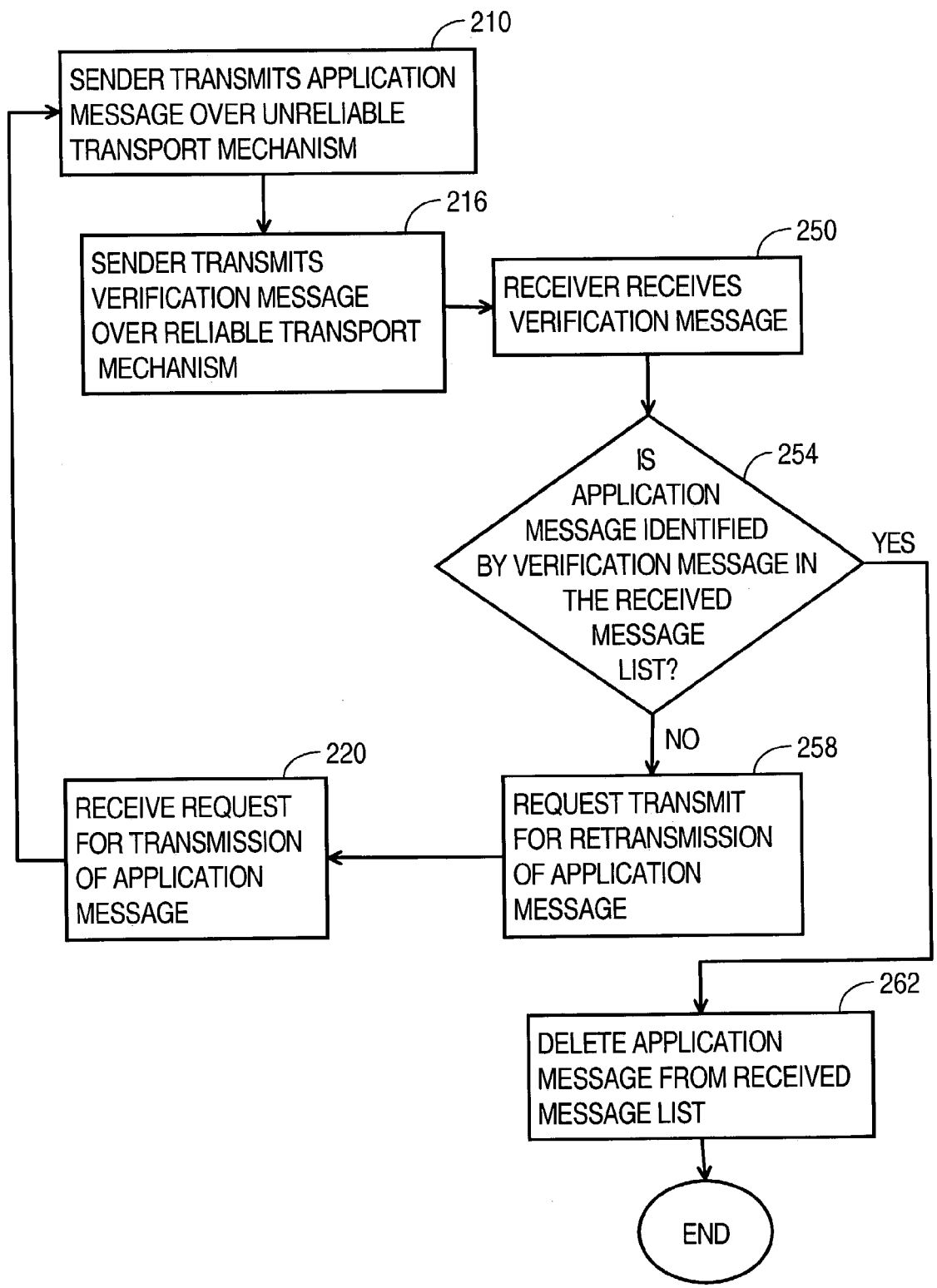
FIG. 2 is a flow chart depicting a process for reliably transmitting data over an unreliable transport mechanism.

FIG. 2 is flow chart that shows a process for reliably transmitting messages over an unreliable transport mechanism. The steps are illustrated using exemplary message transmission system 100.

At step 210, sender 180 transmits application message 120-1 via unreliable transport mechanism 150 to receiver 190.

At step 216, sender 180 transmits a verification message identifying application message 120-1. Specifically, sender 180 transmits verification message 124-1 via reliable transport mechanism 160 to receiver 190.

Step 216 may be commenced before, after, or concurrently with step 210. Furthermore, they may be performed asynchronously or synchronously.

Typically an application message will arrive before the corresponding verification message even though the verification message is smaller, because the application message is transported over the much faster unreliable transport mechanism 150. When application message 120 is received by receiver 190 via unreliable transport mechanism 150, it is added to the received message list 110.

At step 250, receiver 190 receives the verification message 124-1. At step 254, it is determined whether the application message identified by verification message 124-1 (i.e. application message 120-1) is in received message list 110. Because the application message 120-1 is in the received message list 110, control flows to step 262, where application message 120-1 is deleted from the received message list 110.

If, on the other hand, receiver 190 had not received application message 120-1 and inserted it into received message list 110, then at step 250, it would be determined that application message 120-1 is not in received message list 110. In this case, control flows to step 258.

At step 258, receiver 190 transmits a request to sender 180 to retransmit the application message identified by the verification message 124-1. At step 220, the request for retransmission of the application message is received by sender 180. Control flows to step 210, where the application message is retransmitted, and then to step 216, where another verification message for the application message is retransmitted.

The process illustrated by FIG. 2 has various advantages. First, transmission of an application message is guaranteed even though the application message is transmitted over an unreliable transport mechanism. Specifically, a verification message is reliably transmitted to the receiver, guaranteeing that the receiver will, at a minimum, be informed that an application message has been transmitted. If the receiver determines that is has not received the application message, then the receiver requests retransmission of the application message. Receiving verification messages and requesting retransmission when the receiver determines it has not received the application message is a process that is repeated until the receiver determines that it has received the application message.

Furthermore, the transmission of the application message is guaranteed while avoiding the cost of transmitting the application message over a reliable transport. While a verification message corresponding to the application message is generated and transmitted over a reliable transport mechanism, the verification message is smaller then its respective application message. Consequently, less data is transmitted over a reliable transport mechanism. Handshaking, use of buffers to store copies of messages until their delivery is verified, and other forms of overhead incurred to reliably transport data, is reduced.

Tolerance of Application Messages Lost During Transmission

Unreliable transport mechanism 150 does not store a copy of an application message after transmitting it to the network link used by unreliable transport mechanism 150. Preferably, an application tolerates loss of an application message during transmission of unreliable transport mechanism 150, so as long as the application is informed of the loss.

An application may tolerate loss of an application message in a variety of ways. First, an application may simply be able to tolerate the loss by ignoring the loss. Or, it may simply store a copy of the application message until a time-out occurs. If before the time-out occurs that application is notified that the receiver did not receive the application message, the application retransmits the message.

An application may also tolerate the loss of an application message that is repeatable. The term repeatable refers to data that may be recreated without causing undesirable side affects. To illustrate a repeatable message, the following example is provided. A message transmission system may be used to transport messages in a banking system. The application messages include messages that confirm withdrawals, and messages that specify a list of transactions recorded for a period time. A message that confirms withdrawals can only be regenerated by causing another withdrawal—an undesirable side affect. Therefore, messages that confirm withdrawals are not repeatable. On the other hand, the generation of messages that list transactions recorded for a given period of time cause no side affects, and are therefore repeatable.

The present-invention is not limited to use of repeatable application messages. The techniques disclosed herein for transmitting data may be used to transmit any application message whose loss during transmission may be tolerated by an application that is informed of the loss. Therefore, it is understood that the present invention is not limited to application messages that are repeatable.

A verification message may contain information used by an application to reprocess application messages ("reprocessing information"). The term reprocess refers to operations performed by an application to retransmit a message, and includes operations for regenerating an application message, preparing an application message for retransmission to the sender, and re-transmitting the message to the sender. When a receiver requests retransmission of an application message, the receiver transmits the reprocessing information to the receiver. In the example about application messages that specifies transactions recorded for a period of time, reprocessing information may include data that specifies a period of time, an account, and the sender.

Verification Messages that Arrive Early

In some operational contexts, a verification message may be transported over a reliable transport mechanism that is relatively fast compared to the unreliable transport mechanism. The difference in latency between the reliable and unreliable transport mechanism may be relatively small. For example, an unreliable transport mechanism 150 may use a general purpose LAN ("local area network"). Reliable transport mechanism 160, on the other hand, may use a special purpose LAN that is able to transmit data reliably at greater speeds.

Under such circumstances, it may not be unusual for a verification message to arrive before the corresponding application message, even though no problems occurred in the transportation of the application message over unreliable transport mechanism 150. When a verification message arrives before the application message arrives and is inserted into the received message list 110, receiver 190 may request retransmission of the application message, even though no problem occurred during its transmission. The generation of requests for and retransmission of application messages may occur at an undesirably high frequency.

To reduce the frequency of retransmitting application messages, a timeout mechanism may be used. Specifically, after receiver 190 determines that an application message identified by a verification message is not in received message list 110, receiver 190 waits for a period of time. After the period of time expires, receiver 190 then determines whether the received message list 110 now includes the application message, and proceeds as previously described.

Alternatively, after transmitting an application message, sender 180 defers transmitting the corresponding verification message. The deferral ensures that the application message arrives before the verification message.

Hardware Overview

Figure 3:
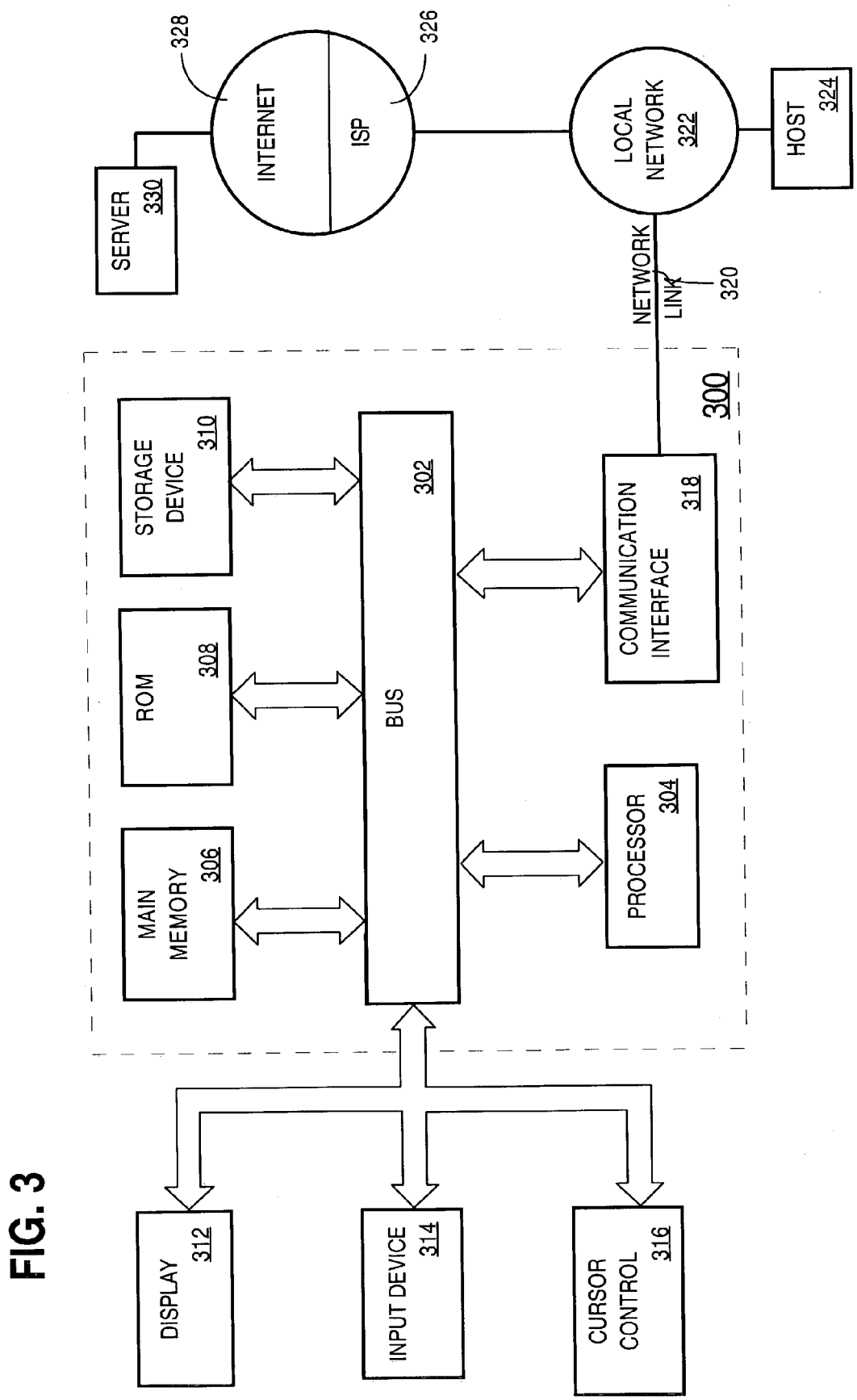
FIG. 3 is a exemplary computer system upon which an embodiment of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of transmitting one or more messages from a sender to a receiver, the method comprising the steps of:
   transmitting over an unreliable transport mechanism said one or more messages to said receiver; and
   transmitting over a reliable transport mechanism a verification message that identifies said one or more messages to said receiver to indicate that said receiver should receive said one or more messages.

2. The method of claim 1, the steps further including:
   storing a copy of said one or more messages;
   receiving a message indicating that said receiver has received said one or more messages; and
   in response to receiving the message indicating that said receiver has received said one or more messages, ceasing to store said copy of said one or more messages.

3. The method of claim 2, wherein the sender performs the steps of storing a copy and ceasing to store.

4. The method of claim 1, the steps further including:
   storing a copy of said one or more messages; and
   after performing the step of transmitting over an unreliable transport mechanism said one or more messages, retransmitting said one or more messages to said receiver based on said copy.

5. The method of claim 4, wherein the step of retransmitting is performed in response to receiving a message from said receiver indicating that said one or more messages have not been received by said receiver.

6. The method of claim 4, wherein the step of retransmitting is performed in response to an expiration of a time-out period.

7. The method of claim 1, wherein the steps further include:
   receiving a response from said receiver that indicates that said one or more messages have not been received by said receiver; and
   in response to receiving said response:
      regenerating said one or more messages, and
      retransmitting said one or more messages to said receiver.

8. The method of claim 1, wherein:
   said sender transmits said one or more messages; and
   said sender does not retransmit said one or more messages if said receiver does not receive said one or more messages.

9. The method of claim 1, wherein the step of transmitting over an unreliable transport mechanism is commenced after performing the step of transmitting over a reliable transport mechanism.

10. The method of claim 1, wherein the step of transmitting over an unreliable transport mechanism is commenced before performing the step of transmitting over a reliable transport mechanism.

11. The method of claim 1, wherein the step of transmitting over an unreliable transport mechanism and the step of transmitting over a reliable transport mechanism are performed synchronously.

12. The method of claim 1, wherein:
   the step of transmitting over an unreliable transport mechanism includes transmitting said one or more messages via a network that uses a first type of medium; and
   the step of transmitting over a reliable transport mechanism includes transmitting said verification message via a network that uses a second type of medium different than said first type of medium.

13. The method of claim 1, wherein the step of transmitting over an unreliable transport mechanism or the step of transmitting over a reliable transport mechanism includes transmitting data over a wireless network.

14. The method of claim 1, wherein:
   the step of transmitting over an unreliable transport mechanism includes said sender transmitting said one or more messages via an LAN that uses a first LAN protocol;
   the step of transmitting over a reliable transport mechanism includes said sender transmitting said verification message via a LAN that uses a second LAN protocol; and
   wherein said first LAN protocol is different than said second LAN protocol.

15. The method of claim 1, wherein:
   said sender is connected to a local area network;
   the step of transmitting over an unreliable transport mechanism includes transmitting said one or more messages via said local area network; and
   the step of transmitting over a reliable transport mechanism includes transmitting said verification message via said local area network.

16. The method of claim 15, wherein:
   the step of transmitting over an unreliable transport mechanism includes transmitting said one or more messages via a network that uses a first type of medium; and
   the step of transmitting over a reliable transport mechanism includes transmitting said verification message via a network that uses a second type of medium different than said first type of medium.

17. The method of claim 15, wherein the step of transmitting over an unreliable transport mechanism or the step of transmitting over a reliable transport mechanism includes transmitting data over a wireless network.

18. The method of claim 1, wherein the step of transmitting over an unreliable transport mechanism said one or more messages includes transmitting a database data block.

19. The method of claim 1, wherein the step of transmitting over a reliable transport mechanism includes causing a one or more hardware components with circuitry configured to follow a reliable protocol to transmit said data using said reliable protocol.

20. A computer-readable medium carrying one or more sequences of instructions for transmitting one or more messages from a sender to a receiver, wherein execution of the one or more sequences of instructions by one or more processors causes the one or more processors to perform the steps of:
   transmitting over an unreliable transport mechanism said one or more messages to said receiver; and
   transmitting over a reliable transport mechanism a verification message that identifies said one or more messages to said receiver to indicate that said receiver should receive said one or more messages.

21. The computer-readable medium of claim 20, the steps further including:
   storing a copy of said one or more messages;
   receiving a message indicating that said receiver has received said one or more messages; and
   in response to receiving the message indicating that said receiver has received said one or more messages, ceasing to store said copy of said one or more messages.

22. The computer-readable medium of claim 21, wherein the sender performs the steps of storing a copy and ceasing to store.

23. The computer-readable medium of claim 20, the steps further including:
storing a copy of said one or more messages; and
after performing the step of transmitting over an unreliable transport mechanism said one or more messages, retransmitting said one or more messages to said receiver based on said copy.

24. The computer-readable medium of claim 23, wherein the step of retransmitting is performed in response to receiving a message from said receiver indicating that said one or more messages have not been received by said receiver.

25. The computer-readable medium of claim 23, wherein the step of retransmitting is performed in response to an expiration of a time-out period.

26. The computer-readable medium of claim 20, wherein the steps further include:
receiving a response from said receiver that indicates that said one or more messages have not been received by said receiver; and
in response to receiving said response:
regenerating said one or more messages, and
retransmitting said one or more messages to said receiver.

27. The computer-readable medium of claim 20, wherein:
said sender transmits said one or more messages; and
said sender does not retransmit said one or more messages if said receiver does not receive said one or more messages.

28. The computer-readable medium of claim 20, wherein the step of transmitting over an unreliable transport mechanism is commenced after performing the step of transmitting over a reliable transport mechanism.

29. The computer-readable medium of claim 20, wherein the step of transmitting over an unreliable transport mechanism is commenced before performing the step of transmitting over a reliable transport mechanism.

30. The computer-readable medium of claim 20, wherein the step of transmitting over an unreliable transport mechanism and the step of transmitting over a reliable transport mechanism are performed synchronously.

31. The computer-readable medium of claim 20, wherein:
the step of transmitting over an unreliable transport mechanism includes transmitting said one or more messages via a network that uses a first type of medium; and
the step of transmitting over a reliable transport mechanism includes transmitting said verification message via a network that uses a second type of medium different than said first type of medium.

32. The computer-readable medium of claim 20, wherein the step of transmitting over an unreliable transport mechanism or the step of transmitting over a reliable transport mechanism includes transmitting data over a wireless network.

33. The computer-readable medium of claim 20, wherein:
the step of transmitting over an unreliable transport mechanism includes said sender transmitting said one or more messages via an LAN that uses a first LAN protocol;
the step of transmitting over a reliable transport mechanism includes said sender transmitting said verification message via a LAN that uses a second LAN protocol; and
wherein said first LAN protocol is different than said second LAN protocol.

34. The computer-readable medium of claim 20, wherein:
said sender is connected to a local area network;
the step of transmitting over an unreliable transport mechanism includes transmitting said one or more messages via said local area network; and
the step of transmitting over a reliable transport mechanism includes transmitting said verification message via said local area network.

35. The computer-readable medium of claim 34, wherein:
the step of transmitting over an unreliable transport mechanism includes transmitting said one or more messages via a network that uses a first type of medium; and
the step of transmitting over a reliable transport mechanism includes transmitting said verification message via a network that uses a second type of medium different than said first type of medium.

36. The computer-readable medium of claim 34, wherein the step of transmitting over an unreliable transport mechanism or the step of transmitting over a reliable transport mechanism includes transmitting data over a wireless network.

37. The computer-readable medium of claim 20, wherein the step of transmitting over an unreliable transport mechanism said one or more messages includes transmitting a database data block.

38. The computer-readable medium of claim 20, wherein the step of transmitting over a reliable transport mechanism includes causing a one or more hardware components with circuitry configured to follow a reliable protocol to transmit said data using said reliable protocol.

39. A computer system configured for transmitting one or more messages from a sender to a receiver, said computer system configured to perform the steps of:
transmitting over an unreliable transport mechanism said one or more messages to said receiver; and
transmitting over a reliable transport mechanism a verification message that identifies said one or more messages to said receiver to indicate that said receiver should receive said one or more messages.

40. The computer system of claim 39, the steps further including:
storing a copy of said one or more messages;
receiving a message indicating that said receiver has received said one or more messages; and
in response to receiving the message indicating that said receiver has received said one or more messages, ceasing to store said copy of said one or more messages.

41. The computer system of claim 40, wherein the sender performs the steps of storing a copy and ceasing to store.

42. The computer system of claim 39, the steps further including:
storing a copy of said one or more messages; and
after performing the step of transmitting over an unreliable transport mechanism said one or more messages, retransmitting said one or more messages to said receiver based on said copy.

43. The computer system of claim 42, wherein the step of retransmitting is performed in response to receiving a message from said receiver indicating that said one or more messages have not been received by said receiver.

44. The computer system of claim 42, wherein the step of retransmitting is performed in response to an expiration of a time-out period.

45. The computer system of claim 39, wherein the steps further include:
receiving a response from said receiver that indicates that said one or more messages have not been received by said receiver; and
in response to receiving said response:
regenerating said one or more messages, and
retransmitting said one or more messages to said receiver.

46. The computer system of claim 39, wherein:
said sender transmits said one or more messages; and
said sender does not retransmit said one or more messages if said receiver does not receive said one or more messages.

47. The computer system of claim 39, wherein the step of transmitting over an unreliable transport mechanism is commenced after performing the step of transmitting over a reliable transport mechanism.

48. The computer system of claim 39, wherein the step of transmitting over an unreliable transport mechanism is commenced before performing the step of transmitting over a reliable transport mechanism.

49. The computer system of claim 39, wherein the step of transmitting over an unreliable transport mechanism and the step of transmitting over a reliable transport mechanism are performed synchronously.

50. The computer system of claim 39, wherein:
the step of transmitting over an unreliable transport mechanism includes transmitting said one or more messages via a network that uses a first type of medium; and
the step of transmitting over a reliable transport mechanism includes transmitting said verification message via a network that uses a second type of medium different than said first type of medium.

51. The computer system of claim 39, wherein the step of transmitting over an unreliable transport mechanism or the step of transmitting over a reliable transport mechanism includes transmitting data over a wireless network.

52. The computer system of claim 39, wherein:
the step of transmitting over an unreliable transport mechanism includes said sender transmitting said one or more messages via an LAN that uses a first LAN protocol;
the step of transmitting over a reliable transport mechanism includes said sender transmitting said verification message via a LAN that uses a second LAN protocol; and
wherein said first LAN protocol is different than said second LAN protocol.

53. The computer system of claim 39, wherein:
said sender is connected to a local area network;
the step of transmitting over an unreliable transport mechanism includes transmitting said one or more messages via said local area network; and
the step of transmitting over a reliable transport mechanism includes transmitting said verification message via said local area network.

54. The computer system of claim 53, wherein:
the step of transmitting over an unreliable transport mechanism includes transmitting said one or more messages via a network that uses a first type of medium; and
the step of transmitting over a reliable transport mechanism includes transmitting said verification message via a network that uses a second type of medium different than said first type of medium.

55. The computer system of claim 53, wherein the step of transmitting over an unreliable transport mechanism or the step of transmitting over a reliable transport mechanism includes transmitting data over a wireless network.

56. The computer system of claim 39, wherein the step of transmitting over an unreliable transport mechanism said one or more messages includes transmitting a database data block.

57. The computer system of claim 39, wherein the step of transmitting over a reliable transport mechanism includes causing a one or more hardware components with circuitry configured to follow a reliable protocol to transmit said data using said reliable protocol.

58. A computer system configured for transmitting one or more messages from a sender to a receiver, said computer system configured to perform the steps of:
means for transmitting over an unreliable transport mechanism said one or more messages to said receiver; and
means for transmitting over a reliable transport mechanism a verification message that identifies said one or more messages to said receiver to indicate that said receiver should receive said one or more messages.

* * * * *